Patented Apr. 30, 1935

1,999,715

UNITED STATES PATENT OFFICE 1,999,715

EMULSION OF SYNTHETIC RESINS

Horace P. Billings, Merchantville, and Dee A. Hurst, Haddonfield, N. J., assignors to Radio Corporation of America, a corporation of Delaware No Drawing. Application June 30, 1932, Serial No. 620,282

5 Claims. (Cl. 134—26)

This invention relates to synthetic resins and, more particularly, to a method of emulsifying synthetic resins to render them fit for use as a varnish coating in making materials such as phonograph records.

Laminated phonograph records of the thin, flexible type have recently come into fairly extensive use. Records of this type comprise a suitable base, generally of cardboard or paper, covered with one or more layers of a thermoplastic material which, under the action of heat and pressure (and in some cases with subsequent cooling), become hard and therefore suitable for the retention of sound grooves impressed therein.

One class of material employed for surface coatings for phonograph records comprises synthetic resins prepared through the chemical reactions of condensation and polymerization between a phenol and an aldehyde. The phenols may be phenol, resorcinol, cresols or xylenols, while the aldehyde is usually formaldehyde, acetaldehyde or furfural, and the resins may be made of a single phenol with a single aldehyde or any combinations thereof. The condensation product is first formed as a syrupy liquid which may be dissolved in suitable solvents, such as alcohol, and the resulting varnish employed for coating a suitable base material. When the coated product is dried and subjected to the pressure of a heated record matrix, the resin becomes set, with the sound grooves impressed therein.

Among the requirements for records of this type are (1) that the rate of curing, that is, the time required for converting the dried, coated resin into a hard, infusible mass, must be fairly rapid, and (2) that the laminated product shall not curl or warp. The former is essential to economical quantity production, while the latter is necessary if the finished record is to be satisfactory for use. To insure a fairly rapid curing rate, it has been proposed to use resorcinol as the phenolic body, but due to the instability of resorcinol-formaldehyde resins in the "A" state, they can best be used in liquid form as a varnish material. Heretofore, it has been customary to dissolve the resin in a suitable solvent, as stated above, to form the varnish with which the base material is coated. However, varnishes of this type penetrate the fibers of the paper or cardboard base and, consequently, a greater amount of varnish is necessary than that merely sufficient to coat the surface of the base material, making the records relatively more expensive.

In accordance with our invention, instead of dissolving the resin in a solvent, we emulsify the synthetic resin with water by means of chemical emulsifying agents, such as borax, phosphate of soda, and gums (as, for example, gum gamboge), sulphonated oils, glue, dextrine, etc., the alkaline salts acting to enhance emulsification. The resin may be emulsified with or without a solvent, depending upon the nature thereof, and is applied, in emulsified form, to cardboard, paper, parchment, metal, cloth, fibre, or any other suitable base material. This results in less penetration of the fibers of the base and the flow is reduced to a minimum, so that curl of the coated sheets of flexible material is greatly reduced. We are thus able to attain the primary object of our invention, namely, to provide a synthetic resin varnish for phonograph records and like material which will not be subject to the defects present in varnishes of this type heretofore known.

Another object of our invention is to provide an improved synthetic resin varnish which can be readily employed for coating purposes.

Still another object of our invention is to provide an improved synthetic resin varnish, the curing rate of which will not be slower than that of varnishes of a similar nature heretofore employed for like purposes.

A further object of our invention is to provide an improved synthetic resin varnish which has a minimum tendency to penetrate the fibers of a fibrous base when applied thereto.

Still a further object of our invention is to provide an improved synthetic resin varnish which will have minimum necessary tendency to flow and which will be subject to minimum contraction on cooling.

It is another object of our invention to provide an improved synthetic resin varnish which will not cause appreciable curling of the base material to which it is applied.

Still another object of our invention is to provide an improved synthetic resin varnish which is particularly adapted for use in the manufacture of laminated articles, such as laminated phonograph records of the thin, flexible type, which is economical and efficient in use, and which lends itself to rapid quantity production of the laminated articles.

The above and other ancillary objects and advantages of our invention will become more apparent from the following description of one method of forming a resin varnish according to our invention:

100 parts, by weight, of ground resorcinol are placed in a metal container or kettle which is jacketed with an outside container, in turn equipped for steam heating and water cooling. This permits of temperature regulation during the chemical reaction as it is very essential to carefully control the temperature of the reacting substances in order to prevent their conversion to the insoluble stage. The kettle may be equipped with suitable agitators to permit the rapid churning of the kettle contents. To the resorcinol, 112 parts, by weight, of 37.5% formaldehyde solution (formalin) are added, and the temperature is increased to a maximum of 60° C., so that the resorcinol will dissolve.

In a separate container, 8 parts, by weight, of para-nitraniline are dissolved in 20 parts, by weight, of cresol having a boiling point range of from about 215° C. to 230° C. The melted para-nitraniline is added to the formaldehyde solution, and the mass is thoroughly agitated, the reaction temperature being raised to from 70° C. to about 75° C. A plasticizer of vegetable or animal oils and wax with a filler and suitable coloring material may be added as a paste to the mixture in the kettle. As an example, we may employ 8 parts, by weight, of clay, 0.8 part, by weight, of bees wax, and 1 part, by weight, of iron oxide, all best ground in a paint mill or ball mill to obtain thorough dispersion. The paste has been found to mix readily with the thickening liquid in the kettle.

For best results, the temperature should be maintained at no higher than 80° C. When the mass in the kettle becomes stringy, and before gelatinization can take place, the emulsification enhancing agent is added. A water solution (65 parts, by weight) containing 0.1% of borax is added, first slowly, and then rapidly to the agitated resin. The borax, or any other suitable alkaline salt, serves to so enhance the emulsifying action of the wax and/or the oils (and gums, if any are used) as to enable them to properly maintain the resin in suspension in the water. This results from the fact that the borax or other alkaline salt used reduces the surface tension of the water from its normal value at the operating temperatures, thereby more readily effecting a wetting of the resin particles and enabling the wax or other fatty material used to more easily retain the resin particles in suspension. The temperature is dropped to about 20° C. and thickening of the resin takes place. A solution of alcohol (about 65 parts, by weight) or an equal quantity of a 20% benzol or toluene solution in alcohol may be added to the emulsifier to obtain proper consistency. The varnish is immediately strained to remove any foreign particles. The mass is then cooled, with accompanying increase in viscosity of the varnish, and additional alcohol or solvent mixture may be added to obtain the desired viscosity.

In an alternate procedure, we omit the oil paste from the resin until it has been finished. That is, the oils and filler may be introduced after condensation of the phenols to the resin is completed and the mass has been strained.

In the particular case of phonograph records, the varnish may be coated on cardboard, paper, fibre, etc. by means of a "doctor" blade, or a roll. The coating thickness required and the adjustment of the coating device is governed by the use to which the coating is applied.

After two or three days of drying, the coated resin on the base material may be pressed in a mechanically operated embossing press supplied with hot platens or record matrices. If both sides of the base material are coated, we employ two matrices, one fastened to an electrically heated head plate, and the other to a similarly heated base plate in the press. A temperature of from 170° C. to 180° C. permits pressing the records in multiples in 5 to 12 seconds. After the records have been pressed, the individual discs are cut out to give the finished product which, if single faced, requires only coating of the back of the base material with a quick drying lacquer.

Although we have described a certain specific embodiment of our invention, we are fully aware that many modifications thereof are possible. For example, instead of employing resorcinol as one of the phenols, we may employ phenol, cresols, xylenols, or any combination thereof. Similarly, although we have specified formaldehyde in the foregoing description, we may employ any of the other aldehydes or combinations thereof. Furthermore, instead of the specific emulsifying agents mentioned heretofore, we may employ other emulsifying agents, such as Japan wax, sodium oleate, naphthenic acid obtained from petroleum, etc. Also, the borax may be replaced by bicarbonate of soda, sodium carbonate, or phosphate of soda. These materials may be employed in essentially the same manner as the bees wax and borax described above. Our invention, therefore, is not to be restricted except insofar as is necessitated by the prior art and by the spirit of the appended claims.

We claim as our invention

1. The method of forming a synthetic resin varnish which comprises producing a chemical reaction of condensation between a phenol and an aldehyde and emulsifying the resulting condensation product in water by means of a saponifiable wax in the presence of an alkaline salt.

2. The method of forming a synthetic resin varnish which comprises producing a chemical reaction of condensation between resorcinol and formaldehyde and emulsifying the resulting condensation product in water by means of a saponifiable wax in the presence of an alkaline salt.

3. The method of forming a synthetic resin varnish which comprises producing a chemical reaction of condensation between resorcinol and formaldehyde and emulsifying the resulting condensation product in water by means of bees wax in the presence of borax.

4. A varnish comprising a condensation product of resorcinol and formaldehyde, said product being colloidally dispersed in water by means of a saponifiable wax in the presence of an alkaline salt.

5. A varnish comprising a condensation product of resorcinol and formaldehyde colloidally dispersed in water by bees wax in the presence of borax.

HORACE P. BILLINGS.
DEE A. HURST.